United States Patent
Parviainen

(10) Patent No.: US 6,647,403 B2
(45) Date of Patent: Nov. 11, 2003

(54) METHOD AND DIGITAL SIGNAL PROCESSING EQUIPMENT FOR PERFORMING DIGITAL SIGNAL PROCESSING CALCULATION

(75) Inventor: Jari A. Parviainen, Jääli (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/219,823

(22) Filed: Aug. 16, 2002

(65) Prior Publication Data

US 2003/0074384 A1 Apr. 17, 2003

Related U.S. Application Data

(63) Continuation of application No. PCT/FI01/00153, filed on Feb. 16, 2001.

(30) Foreign Application Priority Data

Feb. 18, 2000 (FI) .............................................. 20000378

(51) Int. Cl.[7] ................................................. G06F 7/58
(52) U.S. Cl. ...................................................... 708/605
(58) Field of Search ......................................... 708/605

(56) References Cited

U.S. PATENT DOCUMENTS

| 4,617,427 | A |   | 10/1986 | Vea et al. ............... 179/84 VF |
|-----------|---|---|---------|-------------------------------------|
| 4,949,296 | A |   | 8/1990  | Malinowski ................. 364/752 |
| 5,386,375 | A | * | 1/1995  | Smith .......................... 708/500 |
| 5,537,345 | A |   | 7/1996  | Nakano ....................... 364/752 |
| 5,847,979 | A | * | 12/1998 | Wong et al. ................. 708/500 |

FOREIGN PATENT DOCUMENTS

| EP | 938 042  | 8/1999 |
| JP | 09160758 | 6/1997 |
| JP | 11024893 | 1/1999 |

* cited by examiner

Primary Examiner—David H. Malzahn
(74) Attorney, Agent, or Firm—Pillsbury Winthrop LLP

(57) ABSTRACT

The invention relates to a method and digital signal processing equipment for performing a digital signal processing calculation, the method employing a look-up table in which predetermined numerical values, which are inverse values of square roots of numbers, have been stored. In the method, the look-up table is searched for the inverse value of the square root of a desired number. If the value is found in the look-up table, it is retrieved. If the value is not found in the look-up table, the number is scaled such that the inverse value of the square root of the scaled number is found in the look-up table. The found value is then retrieved from the look-up table and descaled to produce the inverse value of the square root of the number. The inverse value of the square root of the number is used to carry out a calculation.

18 Claims, 4 Drawing Sheets

US 6,647,403 B2

METHOD AND DIGITAL SIGNAL PROCESSING EQUIPMENT FOR PERFORMING DIGITAL SIGNAL PROCESSING CALCULATION

This application is a Continuation of international application PCT/FI01/00153 filed Feb. 16, 2001 which designated the US and was published under PCT article 21(2) in English.

FIELD OF THE INVENTION

The invention relates to a method and digital signal processing equipment implementing the method for performing a calculation in digital signal processing. The solution of the invention can be applied typically in GSM (Global System for Mobile communications) and WCDMA (Wideband Code Division Multiple Access) applications.

BACKGROUND OF THE INVENTION

Digital signal processors (DSP) employ algorithms in which inverse matrices are increasingly common. For the inverse of n*n matrices, $A^{-1}A=I$ is valid, $A^{-1}$ being the inverse matrix of A and I being the unit matrix of n*n. Inverse matrix operations require a plurality of divisions and square root calculations.

According to a prior art solution, diverse algorithms, such as the Newton-Raphson algorithm, may be used to carry out divisions and square root calculations in digital signal processing. These calculations require separate algorithms. In the Newton-Raphson algorithm, equation f(x)=0 is solved by calculating iteration cycles where an initial guess $x_0$ is made on the number to be calculated, i.e. an initial value $x_0$ is assigned. Function f'(x) is a derivative of function f(x), i.e. a tangent to the curve of function f(x). Tangent f'(x) is a straight line touching curve f(x) at point x, i.e. it obtains the same value as f(x). In the first iteration cycle the equation to be calculated is $$x_1 = x_0 - \frac{f(x_0)}{f'(x_0)}$$

in the next iteration cycle $$x_2 = x_1 - \frac{f(x_1)}{f'(x_1)},$$

etc. Three or four iteration cycles are typically carried out.

The time it takes to perform the iterations is function-dependent. Consequently, when relatively time-consuming functions are concerned, slowness may become a problem in the above algorithms.

The Newton-Raphson algorithm, as well as other prior art algorithms, can be used both in fixed point and floating point processors, but for reasons of economy in particular, they are often used in fixed point processors (fixed point DSPs). A drawback of this is that after two, or at most three, iteration cycles the accuracy of the calculation cannot be improved any more because of limited code length. Therefore a problem arises from how to achieve sufficient accuracy, i.e. resolution.

When the prior art solution is implemented in a floating point processor (floating point DSP), a good resolution can be achieved. However, the drawback of the floating point DSP as compared with the fixed point DSP is poor code density. Hence, an operation performed in the floating point DSP requires more memory space than a corresponding operation in the fixed point DSP. This is naturally economically disadvantageous since the memory capacity needed in digital signal processing is usually high to begin with. Another problem with the floating point DSP is that the calculations it performs require more logic than fixed point DSPs, the floating point DSP being therefore also slower than the fixed point processor.

When implementing the above algorithms, the prior art solutions typically use a LUT table (Look-Up Table) for storing the desired numerical values. The numerical values are provided with addresses corresponding to their position in the LUT table, the addresses being used for selecting the values for algorithmic calculations. A LUT table occupies a lot of memory in the processor, which is economically disadvantageous.

One of the concrete problems arising from the above drawbacks of the prior art solutions is that if the algorithm implementation fails to provide a good resolution, the performance of the receiver may degrade too much.

To carry out divisions in digital signal processing, a plural number of chained conditional structures are required, which may be problematic to implement in digital signal processors employing a prior art solution. Moreover, a significant drawback of the prior art solutions is that they require separate algorithms for square root calculations and divisions.

BRIEF DESCRIPTION OF THE INVENTION

It is therefore an object of the invention to provide an improved method for digital signal processing and digital signal processing equipment implementing the method. This is achieved with a method for performing a digital signal processing calculation, the method employing a look-up table in which predetermined numerical values have been stored. The numerical values are inverse values of square roots of numbers; the look-up table is searched for the inverse value of the square root of a desired number; if the inverse value of the square root of the desired number is found in the look-up table, the inverse value of the square root of the number is retrieved from the look-up table; if the inverse value of the square root of the desired number is not found in the look-up table, the number is scaled such that the inverse value of the square root of the scaled number is found in the look-up table; the inverse value of the square root of the scaled number is retrieved from the look-up table; the inverse value of the square root of the scaled number is descaled to produce the inverse value of the square root of the desired number; the inverse value of the square root of the number is used to carry out a calculation.

The invention further relates to digital signal processing equipment for performing a calculation associated with digital signal processing, the processing equipment comprising a look-up table in which predetermined numerical values are stored. The numerical values are inverse values of square roots of numbers. The digital signal processing equipment comprises: means for searching the look-up table for the inverse value of the square root of a desired number; means for retrieving the inverse value of the square root of the number from the look-up table if the inverse value of the square root of the number in question is found; means for scaling the number if the inverse value of the square root of the number in question is not found in the look-up table such that the inverse value of the square root of the scaled number is found in the look-up table; means for retrieving the inverse value of the square root of the scaled number from the look-up table; and means for descaling the inverse value of the square root of the scaled number to produce the inverse value of the square root of the number. The digital signal processing equipment further comprises means for using the inverse value of the square root of the number to carry out a calculation.

The underlying idea of the invention is that the numerical values stored in the table are inverse values of the square roots of numbers and that the table is searched for the inverse value of the square root of a desired number. If the inverse value of the square root of the number in question is found in the look-up table, the inverse value of the square root of the number is retrieved from the table. If the inverse value of the square root of the number in question is not found in the look-up table, the number is scaled such that the inverse value of the square root of the scaled number is found in the look-up table. The inverse value of the square root of the scaled number is then retrieved from the table and the inverse value of the square root of the scaled number is descaled to produce the inverse value of the square root of the number. The inverse value of the square root of the number is then used for performing a calculation.

In the future, inverse matrix operations involving many divisions and square root calculations will occupy an increasingly central role in digital signal processors. The method and digital signal processing equipment of the invention provide a common algorithm implementation and look-up table for rapidly calculating divisions and square roots. With regard to divisions in particular, the number of conditional structures is smaller in the solution of the invention than in prior art solutions, which in turn provides short execution times. The look-up table of the invention which is compressed in a small memory space and the common algorithm implementation for divisions and square root calculations allow space to be saved and thereby significant financial savings to be made.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

Figure 1:
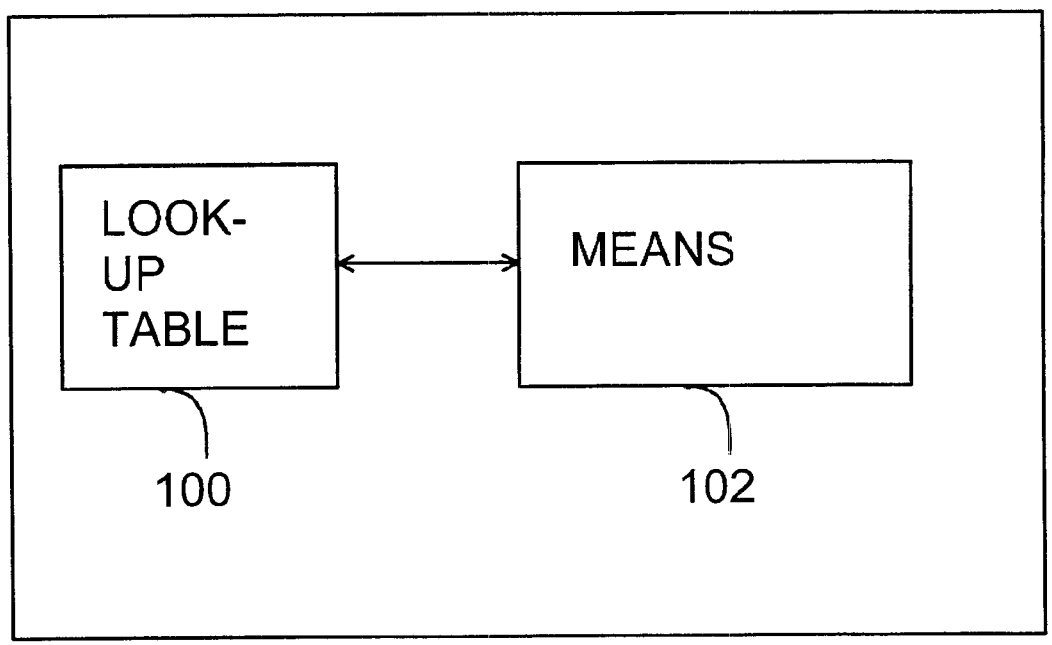
FIG. 1 illustrates an example of digital signal processing equipment of the invention.
Figure 2:
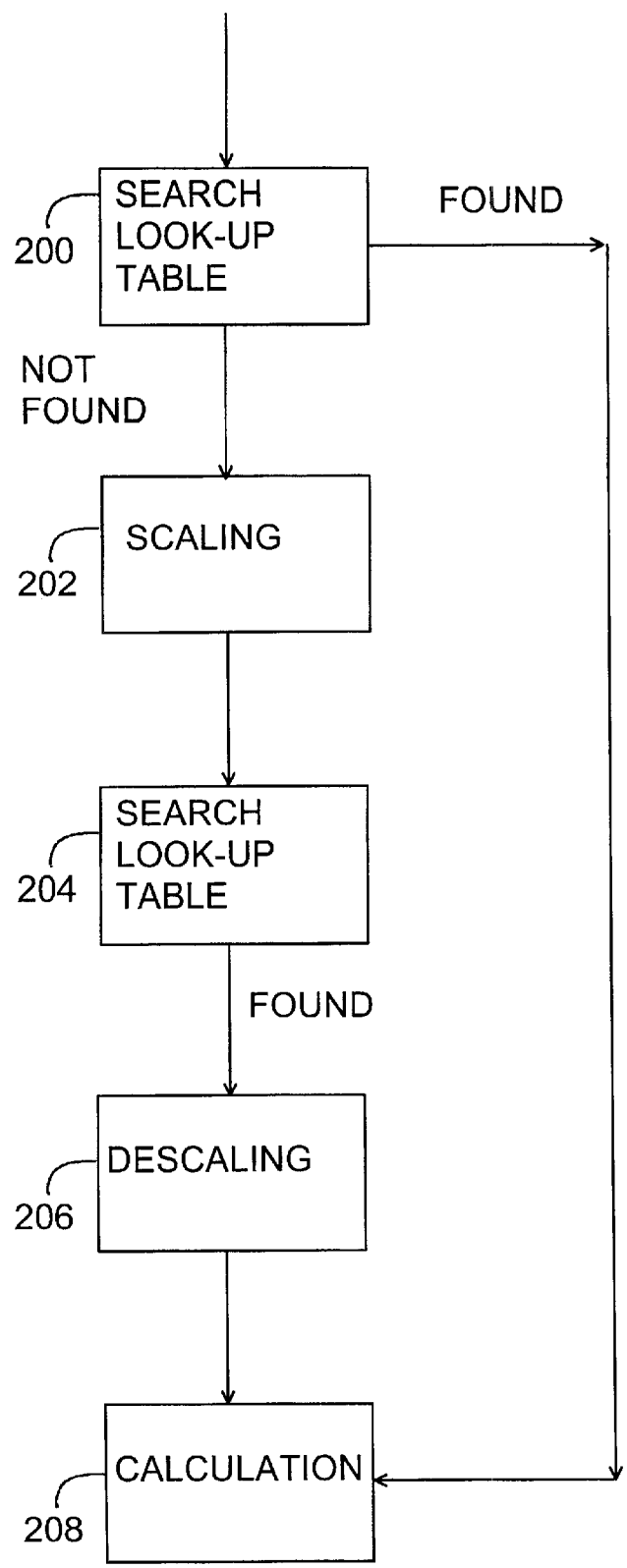
FIG. 2 is a flow diagram illustrating the method of the invention.

FIG. 1 illustrates an example of digital signal processing equipment of the invention and FIG. 2 is a flow diagram illustrating the method of the invention carried out using the digital signal processing equipment. The digital signal processing equipment comprises a look-up table 100 in which inverse values of square roots of numbers have been stored. The numbers in question may be any real or complex numbers. A number may be converted to a desired form in a converter unit, which is not shown in the Figures, possibly comprised by the digital signal processing equipment. The desired form of a number is typically a positive real number. For example, a negative real number may be converted in the converter unit into a positive real number.

The digital signal processing equipment comprises means 102 for performing the following operations, which are shown in the flow diagram of FIG. 2. The inverse value of the square root of a desired number is searched 200 for in the look-up table. If the inverse value of the square root of the number is found in the look-up table, the inverse value of the square root of the number is retrieved from the table. If the inverse value of the square root of the number in question is not found in the look-up table, the number is scaled 202 such that the inverse value of the square root of the scaled number is found in the look-up table. The scaling is typically performed by dividing the number by a scaling number. The scaling number may be any complex or real number, typically a real number. The inverse value of the square root of the scaled number is retrieved 204 from the look-up table and the inverse value of the square root of the scaled number is then descaled 206 to produce the inverse value of the square root of the desired number. The descaling is typically carried out by multiplying the inverse value of the square root of the scaled number with the inverse value of the square root of the scaling number. The digital signal processing equipment may also comprise another converter unit, not shown in the Figures, to convert the inverse value of the square root of the descaled number to a desired form. For example, a negative real number is converted in a converter unit to a positive real number, the inverse value of the square root of the number being then changed in another converter unit to correspond to the inverse value of the square root of the original negative number. The other converter unit performs this by adding a complex number to the inverse value of the square root of the number. When necessary, the digital signal processing equipment may comprise a converter unit in some other location than the one described above.

The solution of the invention allows to use a look-up table 100 in which a relatively small number of inverse values of square roots of numbers has been stored, i.e. the look-up table is compressed into a small memory space.

The digital signal processing equipment also comprises means 102 for carrying out at least one calculation 208 using the inverse value of the square root of the number. When the calculation is a division, it may be carried out by multiplying the dividend by the inverse value of the square root of the number raised in the power of two. A square root calculation may be carried out by multiplying the inverse value of the square root of the number by the number itself. As described above, the method of the invention provides a common algorithm implementation for divisions and square root calculations in digital signal processing, these calculations being essential in telecommunications. An example that can be cited is the conversion of complex number y=a+bi, in which a and b are real numbers, into a polar form or exponential form. Amplitude is determined as follows:

$$A=\sqrt{a^2+b^2}$$

Phase angle is determined as follows:

$$\varphi = \arctan\sqrt{\frac{b}{a}}$$

In the polar coordinates system, the complex number takes the form Y=A(cosφ+i sinφ), its exponent form being Y=Ae$^{i\varphi}$. The divisions and square root calculations needed in these operations can thus be carried out using the solution of the invention.

The means 102 that the digital signal processing equipment comprises are typically carried out by software and located in the processor. Some of the means comprised by the digital signal processing equipment may be electronically implemented; it is also possible that all of them are electronically implemented. The electronic implementation may be carried out using comparators, shifting circuits, multiplier circuits and memory. The technologies typically employed in an electronic implementation are ASIC (Application Specific Integrated Circuit) or FPGA (Field Programmable Gate Array).

Figure 3:
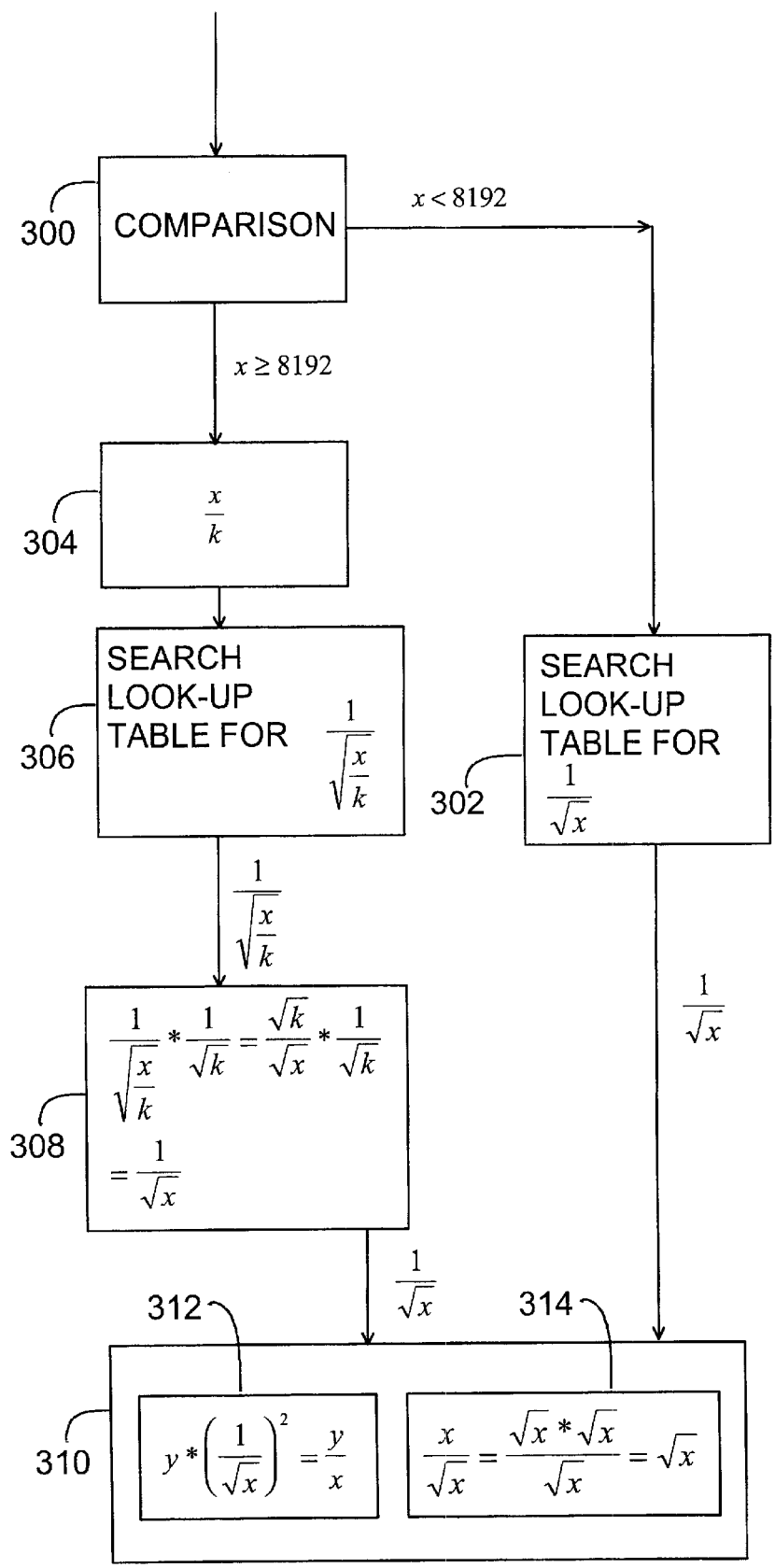
FIG. 3 is a flow diagram illustrating a preferred embodiment of the invention.

FIG. 3 is a flow diagram illustrating a preferred embodiment of the invention in which a LUT table (Look-Up Table) is used.

Inverse values $$\frac{1}{\sqrt{x}}$$

of the square roots of numbers x have been stored in the LUT table. Numbers x are positive real numbers. In the following, operations according to a preferred embodiment of the invention are described which are carried out using the means of the digital signal processing equipment of the preferred embodiment of the invention. A desired number x is compared to a limit number 300. The limit number is 8192, for example. If number x is smaller than the limit number, inverse value $$\frac{1}{\sqrt{x}}$$

of the square root of number x is stored in the LUT table where it can be found on the basis of its address and retrieved 302. The address is typically a numerical value corresponding to number x. If number x is greater than or equal to the limit number, inverse value $$\frac{1}{\sqrt{x}}$$

of the square root of number x is not stored in the LUT table. Number x is then scaled by dividing it with scaling number k 304 which is also a positive real number. The scaling number is 16, for example. Inverse value $$\frac{1}{\sqrt{\frac{x}{16}}} = \frac{4}{\sqrt{x}}$$

of the square root of scaled number $$\frac{1}{16}$$

in question is stored in the LUT table from where it is found on the basis of its address and retrieved 306. The inverse value of the square root of the scaled number is descaled by multiplying inverse value $$\frac{4}{\sqrt{x}}$$

of the square root of the scaled number by inverse value $$\sqrt{\frac{1}{k}}$$

of the square root of the scaling number 308, the inverse value being $$\sqrt{\frac{1}{16}} = \frac{1}{4}$$

in the example. The above descaling produces inverse value $$\frac{1}{\sqrt{x}}$$

of the square root of the desired number x.

The following measures are also carried out using means comprised by the digital signal processing equipment. Inverse value $$\frac{1}{\sqrt{x}}$$

of the square root of the desired number is used for carrying out at least one calculation 310. When the calculation is a division, it is carried out by multiplying dividend y by the inverse value of the square root of the number raised in the power of two $$\left(\frac{1}{\sqrt{x}}\right)^2$$

whereby division $$\frac{y}{x}$$

obtained 312. When a square root calculation is concerned, it is carried out by multiplying the inverse value of the square root of the number by the number itself which produces the following square root value $$\frac{x}{\sqrt{x}} = \frac{\sqrt{x}\sqrt{x}}{\sqrt{x}} = \sqrt{x}$$

314 for the number. As described above, the preferred embodiment of the invention provides a common algorithm implementation for divisions and square root calculations in digital signal processing.

Figure 4:
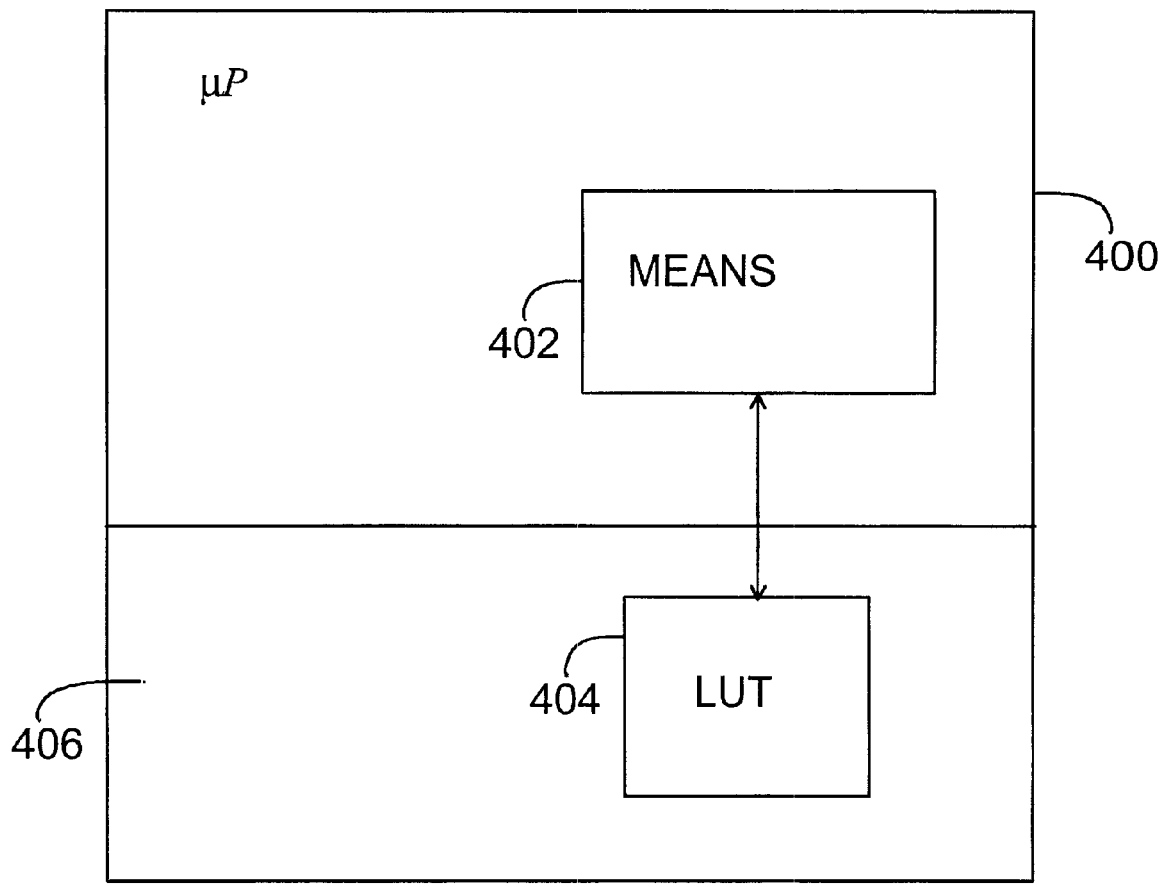
FIG. 4 illustrates digital signal processing equipment of a preferred embodiment of the invention.

FIG. 4 illustrates digital signal processing equipment used for implementing the preferred embodiment of the invention described in connection with FIG. 3 above. The digital signal processing equipment in question is typically arranged in a processer 400. The digital signal processing equipment comprises means 402 which are typically arranged in the processor. The digital signal processing equipment comprises a LUT table 404 which is typically arranged in internal memory 406 of the processor.

The solution of the invention therefore allows the number of numerical values needed in the look-up table to be substantially decreased. Scaling and descaling stages added to the solution of the invention allow the number of numerical values to be further decreased, i.e. the look-up table to be compressed to be smaller still, although at the expense of execution time.

The solution of the invention can also be used for providing initial values for a Newton-Raphson algorithm.

The measures according to the solution of the invention disclosed above are typically carried out to numbers expressed as bits, such as binary numbers. The digital signal processing equipment of the invention may also be implemented using MCM technology (Multi-Chip Module) in which the means and the table are implemented for different semiconductors. The solution of the invention can be used for example in transmitters and receivers of the GSM and WCDMA systems.

Although the invention is described above with reference to an example shown in the attached drawings, it is apparent that the invention is not restricted to it, but can be varied in many ways within the inventive idea disclosed in the attached claims.

What is claimed is:

1. A method for performing a digital signal processing calculation comprising:

employing a look-up table in which predetermined numerical values have been stored, wherein the predetermined numerical values are inverse values of square roots of numbers;

searching the look-up table for an inverse value of a square root of a desired number;

retrieving the inverse value of the square root of the desired number from the look-up table, when the inverse value of the square root of the desired number is found in the look-up table;

wherein, when the inverse value of the square root of the desired number is not found in the look-up table, the method further comprises:

scaling the desired number to produce a scaled number such that an inverse value of a square root of the scaled number is found in the look-up table;

retrieving the inverse value of the square root of the scaled number from the look-up table;

descaling the inverse value of the square root of the scaled number to produce the inverse value of the square root of the desired number; and using the inverse value of the square root of the desired number to carry out a calculation.

2. A method according to claim 1, further comprising selecting the calculation to be performed using the inverse value of the square root from calculations of at least two different types.

3. A method according to claim 1, further comprising carrying out one calculation cycle for each calculation type to complete the calculation.

4. A method according to claim 1, wherein the calculation is a division, and the method further comprises carrying out the calculation by multiplying a dividend by the inverse value of the square root of the desired number raised to the power of two.

5. A method according to claim 1, wherein the calculation is a square root calculation, and the method further comprises carrying out the calculation by multiplying the inverse value of the square root of the desired number by the desired number itself.

6. A method according to claim 1, wherein the scaling is dividing the desired number by a scaling number.

7. A method according to claim 1, wherein the descaling is multiplying the inverse value of the square root of the scaled number by the inverse value of the square root of a scaling number.

8. A method according to claim 1, further comprising:

comparing the desired number to a limit number;

searching the inverse value of the square root of the desired number in the look-up table, when the desired number is smaller than the limit number; and scaling the desired number such that the inverse value of the square root of the scaled number is found in the look-up table, when the desired number is greater than the limit number.

9. A method according to claim 1, further comprising providing initial values for a Newton-Raphson algorithm.

10. Digital signal processing equipment for performing a calculation associated with digital signal processing, the processing equipment comprising a look-up table in which predetermined numerical values are stored, wherein the numerical values are inverse values of the square roots of numbers and the digital signal processing equipment comprises means for searching the look-up table for the inverse value of the square root of a desired number;

means for retrieving the inverse value of the square root of the number from the look-up table when the inverse value of the square root of the number in question is found;

means for scaling the number when the inverse value of the square root of the number in question is not found in the look-up table such that the inverse value of the square root of the scaled number is found in the look-up table; means for retrieving the inverse value of the square root of the scaled number from the look-up table; means for descaling the inverse value of the square root of the scaled number to produce the inverse value of the square root of the number; and that the digital signal processing equipment further comprises means for using the inverse value of the square root of the number to carry out a calculation.

11. Digital signal processing equipment according to claim 10, wherein the calculation to be performed using the inverse value of the square root is selected from calculations of at least two different types.

12. Digital signal processing equipment according claim 10, wherein to complete a calculation, one calculation cycle is carried out for each calculation type.

13. Digital signal processing equipment according to claim 10, wherein the digital signal processing equipment comprises means for carrying out a division by multiplying the dividend by the inverse value of the square root of the number raised in the power of two.

14. Digital signal processing equipment according to claim 10, wherein the digital signal processing equipment comprises means for carrying out a square root calculation by multiplying the inverse value of the square root of the number by the number itself.

15. Digital signal processing equipment according to claim 10, wherein the digital signal processing equipment comprises means for performing scaling by dividing a number with a scaling number.

16. Digital signal processing equipment according to claim 10, wherein the digital signal processing equipment comprises means for performing descaling by multiplying the inverse value of the square root of the scaled number by the inverse value of the square root of the scaling number.

17. Digital signal processing equipment according to claim 10, wherein the digital signal processing equipment comprises means for carrying out the following set of measures: the desired number is compared to a limit number, and, if the number is smaller than the limit number, the inverse value of the square root of the number is found in the look-up table, and, if the number is greater than the limit number, the number is scaled, the inverse value of the square root of the scaled number being then found in the look-up table.

18. Digital signal processing equipment according to claim 10, wherein the digital signal processing equipment comprises said means for providing initial values for a Newton-Raphson algorithm.

* * * * *